United States Patent
Okana et al.

(10) Patent No.: US 6,217,109 B1
(45) Date of Patent: Apr. 17, 2001

(54) BODY STRUCTURE OF MOTOR VEHICLE

(75) Inventors: Fumio Okana; Hayatsugu Harasaki, both of Hiroshima-Ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/493,178

(22) Filed: Jan. 28, 2000

(30) Foreign Application Priority Data

Jan. 29, 1999 (JP) .................................................. 11-023104

(51) Int. Cl.[7] ...................................................... B60J 7/00
(52) U.S. Cl. ...................... 296/203.03; 296/188; 296/189
(58) Field of Search .................... 296/188, 189, 296/203.03, 30, 205, 209, 193, 194

(56) References Cited

U.S. PATENT DOCUMENTS

| | | |
|---|---|---|
| 4,355,843 | 10/1982 | Murakami . |
| 4,440,434 * | 4/1984 | Celli ...................... 296/185 |
| 4,444,818 * | 4/1984 | Tominaga et al. ...................... 428/36 |
| 4,552,400 * | 11/1985 | Harasaki et al. .................. 296/203.03 |
| 4,944,553 | 7/1990 | Medley et al. . |
| 4,986,597 * | 1/1991 | Clausen ............................... 296/205 |
| 5,085,485 * | 2/1992 | Wurl ................................... 296/188 |
| 5,242,209 * | 9/1993 | Yamauchi ....................... 296/203.03 |
| 5,246,264 * | 9/1993 | Yoshii ............................. 296/203.03 |
| 5,370,438 * | 12/1994 | Mori et al. ....................... 296/203.03 |
| 5,372,400 * | 12/1994 | Enning et al. ................... 296/203.03 |
| 5,398,989 * | 3/1995 | Winter et al. ................... 296/203.03 |
| 5,544,933 * | 8/1996 | Shahab et al. ...................... 296/189 |
| 5,609,385 * | 3/1997 | Daniel et al. ...................... 296/188 |
| 5,671,968 * | 9/1997 | Masuda et al. ................. 296/203.03 |
| 5,720,510 * | 2/1998 | Daniel et al. ........................ 296/189 |
| 5,782,525 * | 7/1998 | Honm et al. ......................... 296/188 |
| 5,820,202 * | 10/1998 | Ju ..................................... 296/146.6 |
| 5,938,275 * | 8/1999 | Kleinhans et al. .............. 296/203.03 |
| 5,941,597 * | 8/1999 | Horiuchi et al. ................ 296/203.03 |
| 5,988,733 * | 11/1999 | Kamo et al. ......................... 296/188 |

FOREIGN PATENT DOCUMENTS

| | | |
|---|---|---|
| 195 31 874 C1 | 8/1995 | (DE) . |
| 195 18 946 A1 | 11/1995 | (DE) . |
| 197 0809050A1 | 4/1998 | (DE) . |
| 0 856 455 A2 | 8/1998 | (EP) . |
| 10-218017 | 8/1998 | (JP) . |
| 10-218017 | 8/1998 | (EP) . |
| 198 05 804 A1 | 8/1998 | (DE) . |

* cited by examiner

Primary Examiner—Joseph D. Pape
Assistant Examiner—Kiran B. Patel
(74) Attorney, Agent, or Firm—Nixon Peabody LLP; Donald R. Studebaker (57) ABSTRACT

A body structure of a motor vehicle is disclosed. The vehicle body structure includes a first closed section structure and a second closed section structure. The first closed section structure has a first closed section that is made of a plurality of members. The second closed section structure has a second closed section. The second closed section structure is disposed within the first closed section of the first closed section structure and made of a single member. The second closed section structure has a section configuration that changes in accordance with changes in the inner side configuration of the first closed section structure.

26 Claims, 11 Drawing Sheets

BODY STRUCTURE OF MOTOR VEHICLE

BACKGROUND OF THE INVENTION

1. Field of the Invention

The present invention relates to a body structure of a motor vehicle, and in particular to a body structure of a motor vehicle that is provided with a structure manufactured by a tube hydraulic forming method or the like.

2. Description of the Related Art

It is conventionally known that a hollow structure is obtained by supplying high-pressure fluid such as oil into a raw tube and deforming the tube into a predetermined configuration by using a tube hydraulic forming method.

Japanese Patent Unexamined Publication No. 8-337182 discloses a body structure of a motor vehicle which is provided with two hollow structures formed by a tube hydraulic forming method. In the vehicle body structure, the two hollow structures are mutually connected along a partial area of its longitudinal direction.

Japanese Patent Unexamined Publication No. 9-150752 discloses a vehicle body frame structure that comprises a plurality of hoop-shaped members. The hoop-shaped members are obtained by extruding raw aluminum alloy into hollow members and bending the hollow members. Then, the body frame structure is formed by welding the members to make a doorframe and the like.

Japanese Patent Unexamined Publication No. 10-218017 discloses a center pillar structure of a motor vehicle that is reinforced by an extruded reinforcement which is made of a single member.

U.S. Pat. No. 5,269,585 discloses a motor vehicle body, which is provided with extruded hollow profiles or structures.

Similar examples of such conventional art are also disclosed in Japanese Patent Unexamined Publications No. 10-95364, No. 10-95365, No. 9-30345, No. 10-138950 and No. 8-192238.

Since a hollow structure is formed by uniformly pressurizing a raw tube from its inner side by using a tube hydraulic forming method, the hollow structure can be made from materials such as ultra-high-strength steel. The ultra-high-strength steel has greater tensile strength than material of the conventional structure formed by press molding. As a result, since the hollow structure has greater proof stress and therefore has great strength, the weight of the vehicle body can be decreased. Accordingly, as mentioned above, many vehicle body structures provided with hollow structures formed by the tube hydraulic forming method have been proposed.

However, such hollow structures formed by the tube hydraulic forming method are not enough applied to the vehicle body structure, and various applications of the hollow structures to the vehicle body structure therefore have been demanded.

Further, the application of a hollow structure or a closed section structure made by other than the tube hydraulic forming method to a vehicle body structure also has been demanded.

SUMMARY OF THE INVENTION

It is therefore an object of the present invention to provide a body structure of a motor vehicle that is both light in weight and increased in rigidity or stiffness.

The above object is achieved according to the present invention by providing a body structure of a motor vehicle comprising a first closed section structure having a first closed section which is made of a plurality of members, and a second closed section structure having a second closed section, the second closed section structure being disposed within the first closed section of the first closed section structure and made of a single member, the second closed section structure having a section configuration which changes in accordance with changes in the inner side configuration of the first closed section structure.

In a preferred embodiment of the present invention, the first closed section structure has the first closed section which integrally forms at least a roof rail and a center pillar, and the second closed section is integrally disposed along areas of the roof rail and the center pillar of the first closed section structure.

In another preferred embodiment of the present invention, the first closed section structure has the first closed section which integrally forms at least a center pillar and a side sill, and the second closed section is integrally disposed along areas of the center pillar and the side sill of the first closed section structure.

In another preferred embodiment of the present invention, the first closed section structure has the first closed section which integrally forms at least a roof rail, a center pillar and a side sill, and the second closed section is integrally disposed along areas of the roof rail, the center pillar and the side sill of the first closed section structure.

In another preferred embodiment of the present invention, one surface of the first closed section of the first closed section and one surface of the second closed section of the second closed section are mutually connected at predetermined portions thereof.

In another preferred embodiment of the present invention, one surface of the first closed section of the first closed section and one surface of the second closed section of the second closed section are mutually connected at predetermined portions thereof by a fixing member penetrating through the surfaces of the first and second closed section structures.

In another preferred embodiment of the present invention, the fixing member fixes a door hinge to the first and second closed section structures.

In another preferred embodiment of the present invention, a predetermined portion of the second closed section structure is filled with filler material for reinforcement.

In still another preferred embodiment of the present invention, a plurality of node members are provided along the vehicle front and rear direction within a space between the first and second closed section structures.

In further another preferred embodiment of the present invention, the first closed section structure is manufactured by press molding, and the second closed section structure is manufactured by a tube hydraulic forming method.

In still further another preferred embodiment of the present invention, the first closed section structure has a flange to which seal means is attached.

The above and other objects and features of the present invention will be apparent from the following description by taking reference with accompanying drawings employed for preferred embodiments of the present invention.

DETAILED DESCRIPTION OF THE PREFERRED EMBODIMENTS

Hereinafter, the preferred embodiments of the present invention will be explained with reference to the drawings.

A first embodiment of the present invention will be explained with reference to FIGS. 1 through 8.

Figure 1:
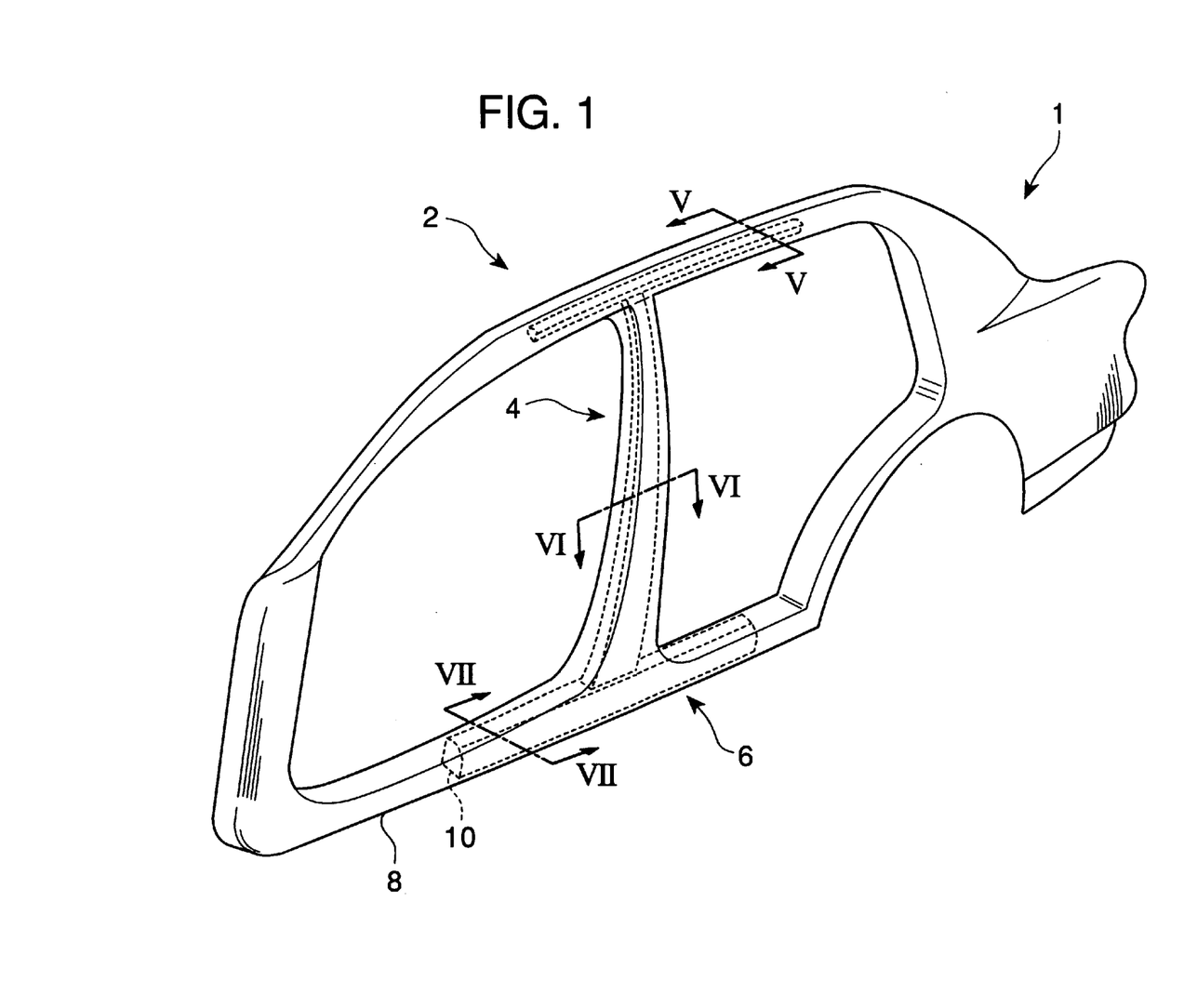
FIG. 1 is an overall perspective view of a body structure of a motor vehicle according to a first embodiment of the present invention.
Figure 2:
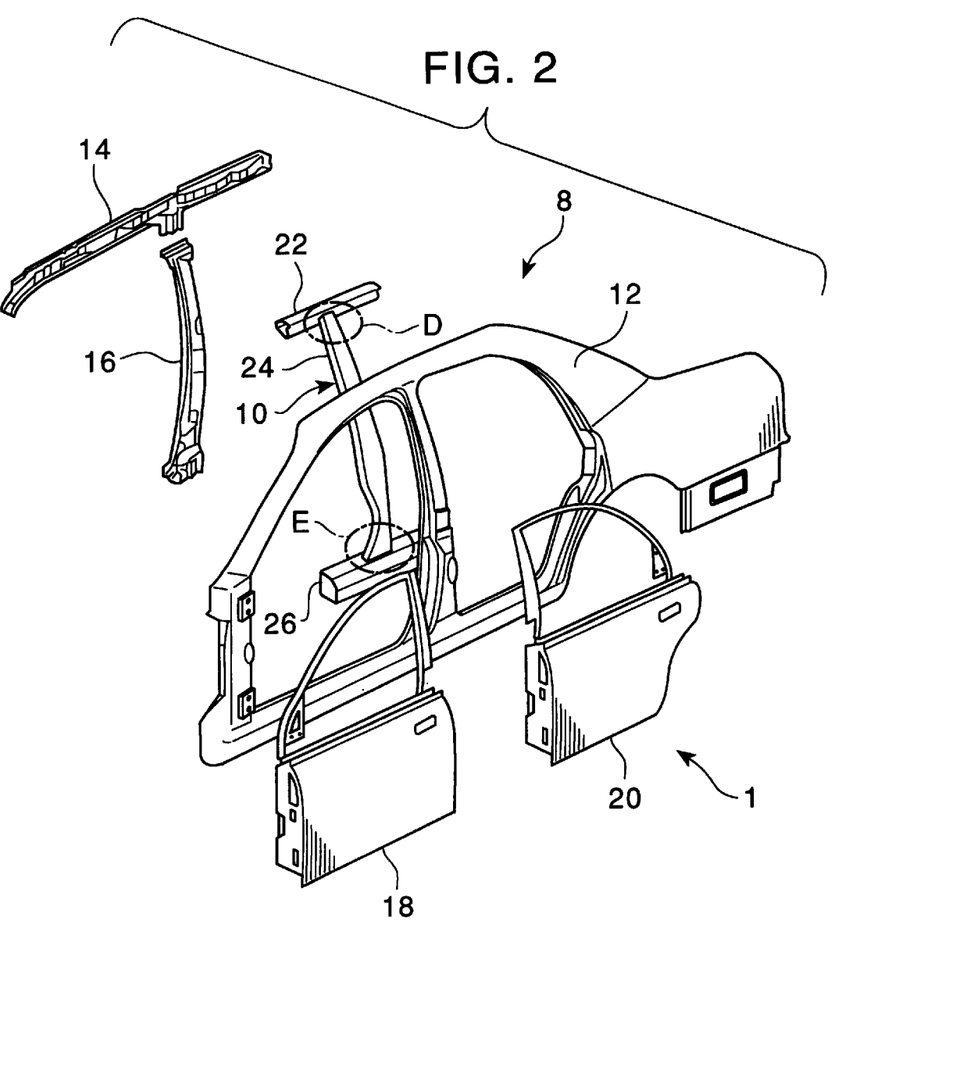
FIG. 2 is an exploded perspective view of components of the first embodiment of FIG. 1.

Referring to FIGS. 1 and 2, a reference numeral 1 designates a side body structure of a motor vehicle which is provided with a roof rail section 2, a center pillar section 4 and a side sill section 6. The vehicle side body structure 1 comprises a first closed section structure 8 made of a combination of a plurality of members and a second closed section structure 10 made of a single member. The second closed section structure 10 is disposed at an inner side of the first closed section structure 8.

Referring to FIG. 2, the first closed section structure 8 is composed of a side frame outer panel 12, a roof rail inner 14, a center pillar inner 16 and other inner panels (not shown). The roof rail inner 14, the center pillar inner 16 and other inner panels are attached to the passenger compartment side of the side frame outer panel 12. The side frame outer panel 12, the roof rail inner 14, the center pillar inner 16 and other inner panels forming the first closed section structure 8 are all manufactured by press molding.

Front doors 18 and rear doors 20 are respectively attached to the side frame outer panel 12 of the vehicle side body structure 1.

The second closed section structure 10 is composed of a roof rail reinforcement 22, a center pillar reinforcement 24 and a side sill reinforcement 26.

Figure 3:
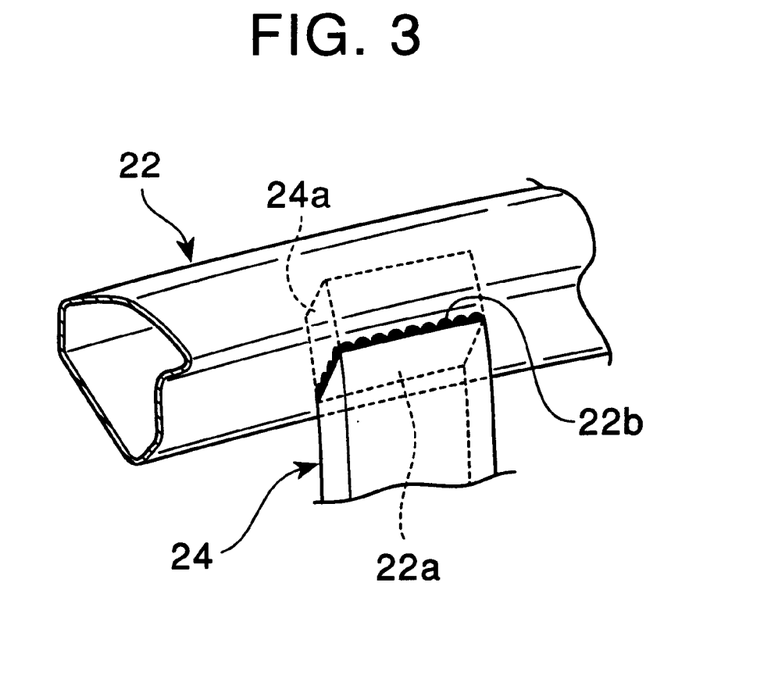
FIG. 3 is an enlarged perspective view of a portion designated as D in FIG. 2.

Referring to FIG. 3, an upper end 24a of the center pillar reinforcement 24 is inserted into an opening 22a of the roof rail reinforcement 22 and is connected with a connection portion 22b of the roof rail reinforcement 22 by welding or the like. Thus, the upper end 24a of the center pillar reinforcement 24 is connected with the roof rail reinforcement 22.

Figure 4:
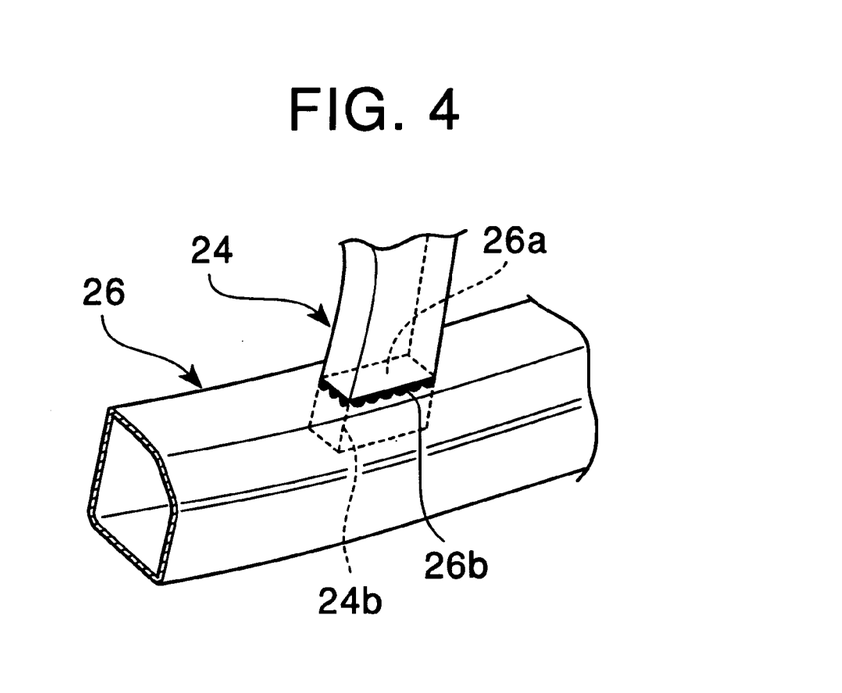
FIG. 4 is an enlarged perspective view of a portion designated as E in FIG. 2.

Referring to FIG. 4, a lower end 24b of the center pillar reinforcement 24 is inserted into an opening 26a of the side sill reinforcement 26 and is connected with a connection portion 26b of the side sill reinforcement 26 by welding or the like. Thus, the lower end 24b of the center pillar reinforcement 24 is connected with the side sill reinforcement 26.

The second closed section structure 10 is formed in the following manner. First, the roof rail reinforcement 22, the center pillar reinforcement 24 and the side sill reinforcement 26 are respectively manufactured by supplying high-pressure fluid such as oil into raw tubes and then deforming the tubes into predetermined configurations under predetermined conditions of the tube hydraulic forming method. Thereafter, as mentioned above, the upper end 24a of the center pillar reinforcement 24 is connected with the roof rail reinforcement 22, and the lower end 24b of the center pillar reinforcement 24 is connected with the side sill reinforcement 26. As a result, the integrally formed second closed section structure 10 is obtained. The sectional configuration of the second closed section structure 10 changes in accordance with changes in the inner side configuration of the first closed section structure 8.

Next, respective sectional configurations of the vehicle side body structure 1 will be explained with references to FIGS. 5 through 7.

Figure 5:
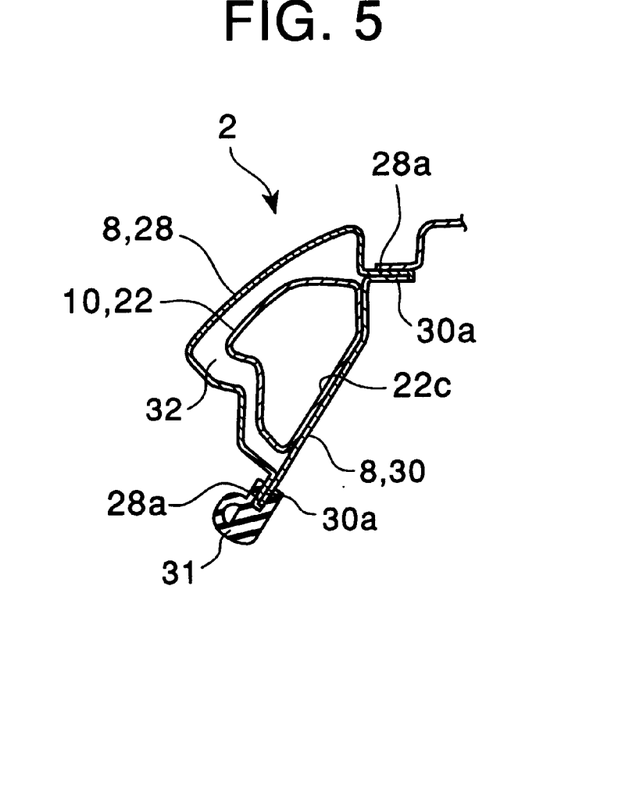
FIG. 5 is a sectional view of the first embodiment taken along line V—V in FIG. 1.

Referring to FIG. 5, in the roof rail reinforcement 2 of the side body structure 1, the roof rail outer 28 (a part of the side frame outer panel 12) of the first closed section structure 8 is disposed at an outer side. The roof rail inner 30 of the first closed section structure 8 is disposed at an inner side. Flanges 28a and 30a of the roof rail outer 28 and the roof rail inner 30 are mutually connected so as to form a closed section 32. A seal member 31 is attached to the flanges 28a and 30a to contact the door 20 so that an opening for the door 20 is sealed. Further, the roof rail reinforcement 22 of the second closed section structure 10 is inserted into the closed section 32 of the first closed section structure. A part 22c of the surface of the roof rail reinforcement 22 located at an inner side thereof is connected with the roof rail inner 30 by spot welding. In the first embodiment, in the roof rail section 2, the roof rail inner 30 of the first closed section structure 8 may be disposed to be spaced apart from the roof rail reinforcement 22 of the second closed section structure 10.

Figure 6:
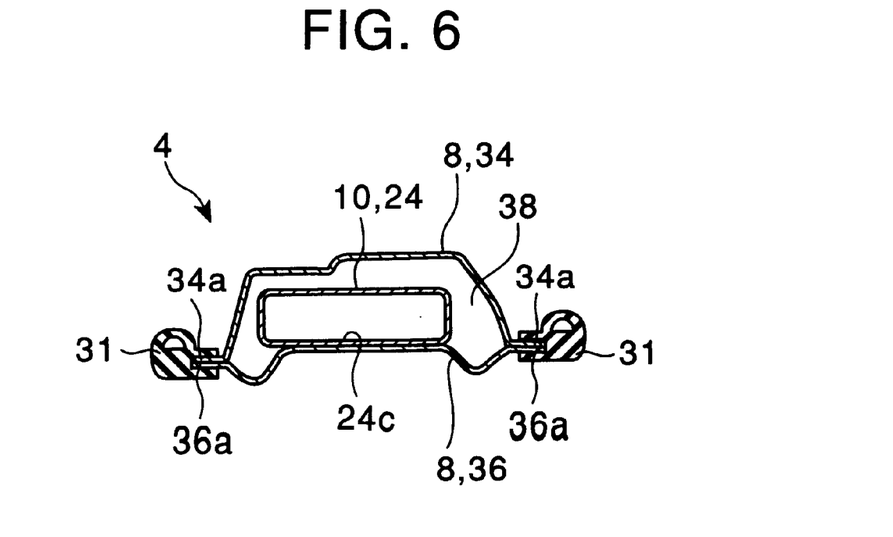
FIG. 6 is a sectional view of the first embodiment taken along line VI—VI in FIG. 1.

Referring to FIG. 6, in the center pillar section 4 of the side body structure 1, a center pillar outer 34 (a part of the side frame outer panel 12) of the first closed section structure 8 is disposed at an outer side. A center pillar inner 36 of the first closed section structure 8 is disposed at an inner side. Flanges 34a and 36a of the center pillar outer 34 and center pillar inner 36 are mutually connected so as to form a closed section 38. Seal members 31 are attached to the flanges 34a and 36a to contact the doors 18 and 20 so that the openings for the doors 18 and 20 are sealed. Further, the center pillar reinforcement 24 of the second closed section structure 10 is inserted into the closed section 38 of the first closed section structure 8. A part 24c of the surface of the center pillar reinforcement 24 located at an inner side thereof is connected with the center pillar inner 36 by spot welding. In the first embodiment, in the center pillar section 4, the center pillar reinforcement 24 of the second closed section structure 10 may be disposed to be spaced apart from the center pillar inner 36 of the first closed section structure 8.

Figure 7:
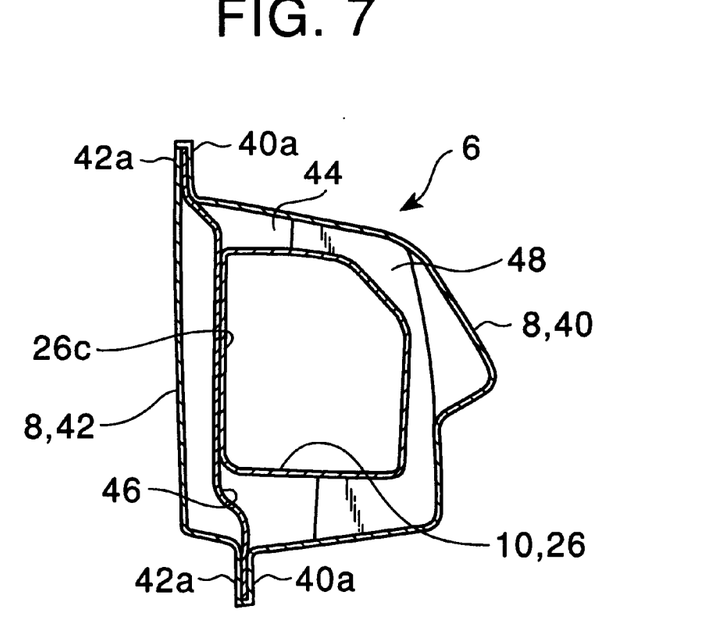
FIG. 7 is a sectional view of the first embodiment taken along line VII—VII in FIG. 1.

Referring to FIG. 7, in the side sill section 6 of the side body structure 1, a side sill outer 40 (a part of the side frame outer panel 12) of the first closed section structure 8 is disposed at an outer side. A side sill inner 42 of the first closed section structure 8 is disposed at an inner side. Flanges 40a and 42a of the side sill outer 40 and the side sill inner 42 are mutually connected so as to form a closed section 44. Further, a reinforcement 46 is further disposed within the closed section 44 of the first closed section structure 8 to increase the rigidity of the side sill section 6. The side sill reinforcement 26 of the second closed section structure 10 is inserted into the closed section 44 of the first closed section structure 10. A part 26c of the surface of the side sill reinforcement 26 located at an inner side thereof is connected with the reinforcement 46 by spot welding. A plurality of flat plate node members 48 are disposed between the side sill outer 40 and the side sill reinforcement 26 along the side sill section 6 and spaced apart to each other. As a result, the rigidity of the side sill section 6 is increased and the distortion of the side sill section 6 is prevented. In the first embodiment, if the reinforcement 46 is not provided, the part 26c of the surface of the side sill reinforcement 26 located at an inner side thereof may be directly connected with the side sill inner 42. Further, if the reinforcement 46 is not provided, the side sill reinforcement 26 may be spaced apart from the side sill inner 42.

Figure 8:
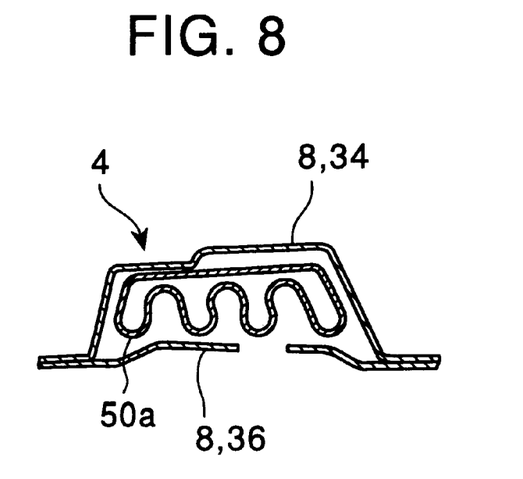
FIG. 8 is a sectional view corresponding to FIG. 6 showing a variation of the first embodiment.

In the first embodiment of the present invention, as explained above, the center pillar reinforcement 24 of the second closed section structure 10 has a rectangular sectional configuration. However, the embodiment is not limited to this configuration. As shown in FIG. 8, the center pillar reinforcement 50 may have a sectional configuration including a wavy form 50a.

The first embodiment of the present invention has the following advantageous effects.

According to the first embodiment, the first closed section structure 8 is combined with the second closed section structure 10 inserted into the first structure 8 to obtain the side body structure 1. Namely, the two closed section structures 8 and 10 are used to obtain the side body structure 1. As a result, the rigidity of the side body structure 1 is increased.

Since the second closed structure 10 is made of the single member, the amount of material and the number of components are both decreased and thus the weight of the vehicle side body structure 1 is lightened.

The second closed section structure 10 is manufactured by the tube hydraulic forming method. Accordingly, the rigidity or stiffness of the side body structure 1 is increased and the weight of the side body structure 1 is decreased, in comparison with the conventional side body structure manufactured by the press molding.

Since the sectional configuration of the second closed section structure 10 changes in accordance with changes in the inner side configuration of the first closed section structure 8, the number of the components can be decreased.

The first closed section structure 8 composed of the inner panel, the outer panel and the like is disposed at the outer side of the second closed section structure 10. Accordingly, the flanges of the inner and outer panels of the first structure 8 can be effectively utilized as the connection portions with the seal portions and the glasses.

Next, a second embodiment of the present invention will be explained with reference to FIGS. 9 through 11.

In the center pillar section 4 of the side body structure 1, an anchor bolt is provided for a seat belt attached to an upper portion of a passenger compartment side of the center pillar section 4. A hinge bolt is also provided for a door hinge attached to an outer center portion of the center pillar section 4. The anchor bolt and the hinge bolt are utilized according to the second embodiment.

Figure 9:
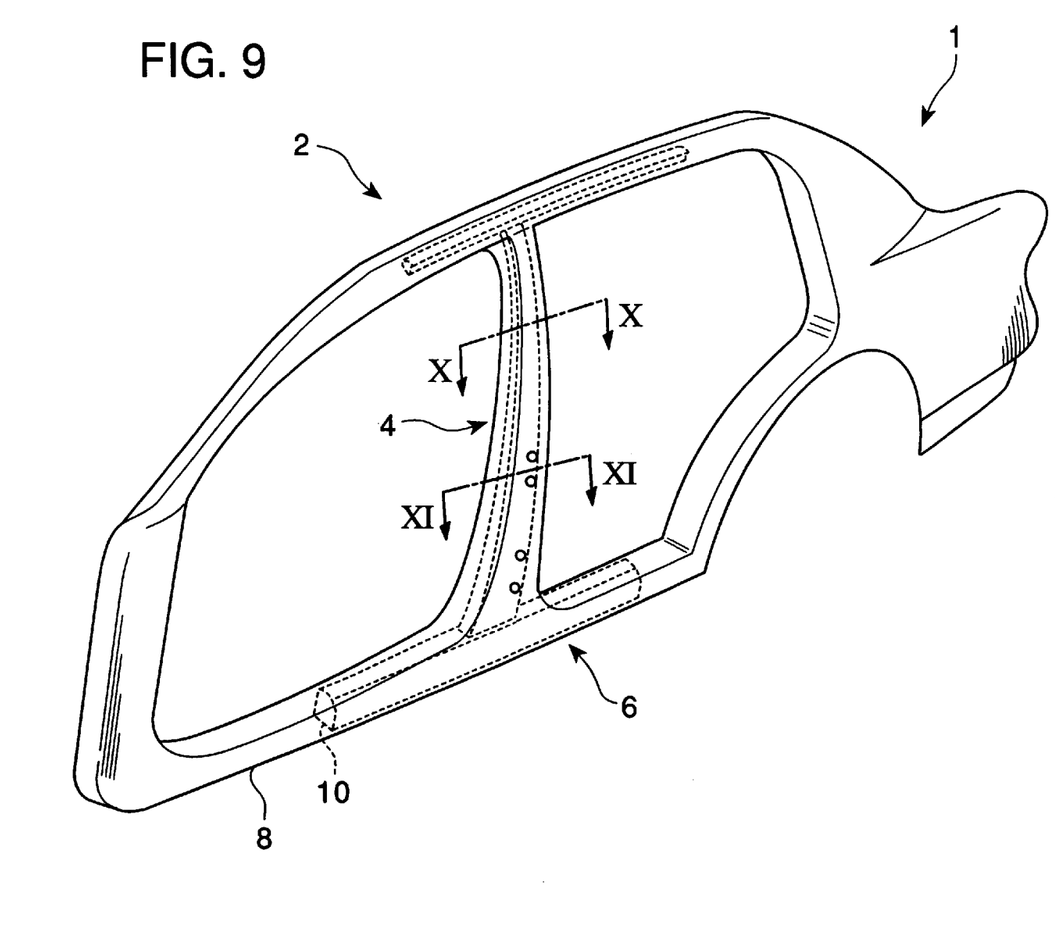
FIG. 9 is an overall perspective view of a body structure of a motor vehicle according to a second embodiment of the present invention.
Figure 10:
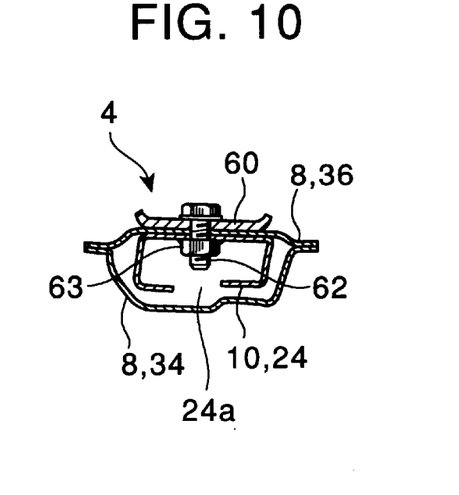
FIG. 10 is a sectional view of the second embodiment taken along line X—X in FIG. 9.

Referring to FIGS. 9 and 10, an anchor plate 60 for supporting a seat belt (not shown) is integrally connected with an anchor bolt 62. The anchor bolt 62 penetrates through both the center pillar inner 36 of the first structure 8 and the center pillar reinforcement 24 of the second structure 10. The anchor bolt 62 is finally connected with the first and second structures 8 and 10 by a nut 63. The nut 63 is attached to the anchor bolt 62 through an opening 24a provided in the center pillar reinforcement 24, and thereafter the peripheral portion of the nut 63 is welded to the center pillar reinforcement 24. As a result, the conventional anchor bolt 62 for the seat belt can be effectively used and therefore the pillar inner 36 does not need to be connected with the center pillar reinforcement 24, the contrary to the first embodiment. However, in the second embodiment, in addition to the use of the anchor bolt 62, the pillar inner 36 may be connected with the center pillar reinforcement 24, like the first embodiment.

Figure 11:
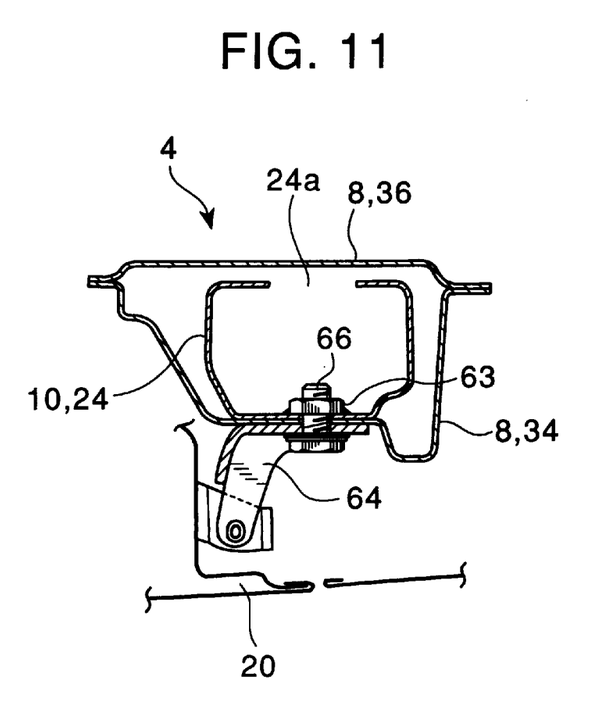
FIG. 11 is a sectional view of the second embodiment taken along line XI—XI in FIG. 9.

Referring to FIGS. 9 and 11, a door hinge 64 for opening and closing the rear door 20 is integrally connected with a hinge bolt 66. The hinge bolt 66 penetrates through both the center pillar outer 34 of the first structure 8 and the center pillar reinforcement 24 of the second structure 10. The hinge bolt 66 is finally connected with the first and second structures 8 and 10 by a nut 63. The nut 63 is attached to the hinge bolt 66 through an opening 24a provided in the center pillar reinforcement 24, and thereafter the peripheral portion of the nut 66 is welded to the center pillar reinforcement 24. As a result, the conventional hinge bolt 66 for the door hinge can be effectively used and therefore the second closed structure 10 does not need to be connected with the first closed section structure 8, the contrary to the first embodiment. However, in the second embodiment, in addition to the use of the hinge bolt 66, the second closed structure 10 may be connected with the first closed section structure 8.

Next, a third embodiment of the present invention will be explained with reference to FIGS. 12 through 13.

Figure 12:
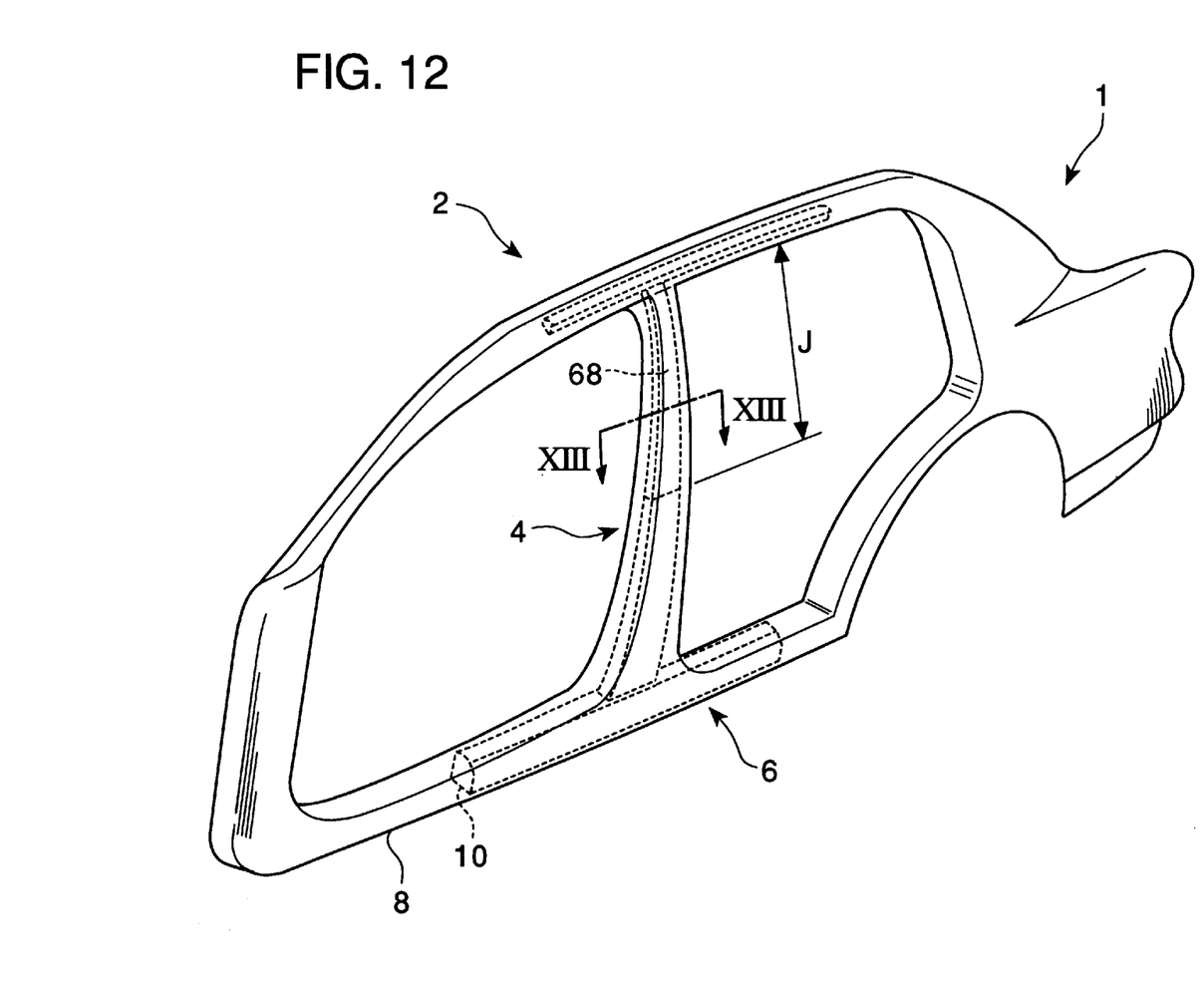
FIG. 12 is an overall perspective view of a body structure of a motor vehicle according to a third embodiment of the present invention.
Figure 13:
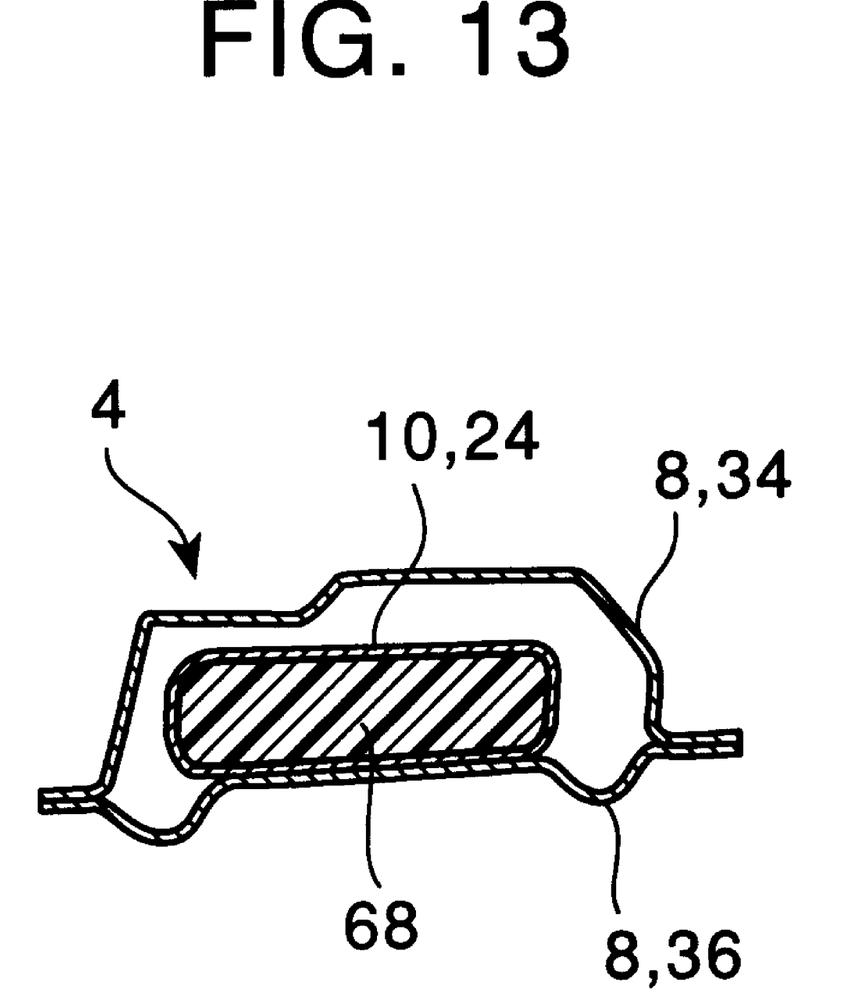
FIG. 13 is a sectional view of the third embodiment taken along line XIII—XIII in FIG. 12.

Referring to FIGS. 12 and 13, in the center pillar section 4 of the side body structure 1, the upper area designated as J of the door opening has a relatively weak rigidity. Therefore, in the third embodiment, the upper area J of the center pillar reinforcement 24 of the second structure 10 is filled with high rigidity foam filler material 68 such as high strength epoxy foam filler material (namely thermoplastic) or the like. As a result, the upper area J of the door opening with a relatively weak rigidity can be easily strengthened.

Next, a fourth embodiment of the present invention will be explained with reference to FIGS. 14 through 15.

Figure 14:
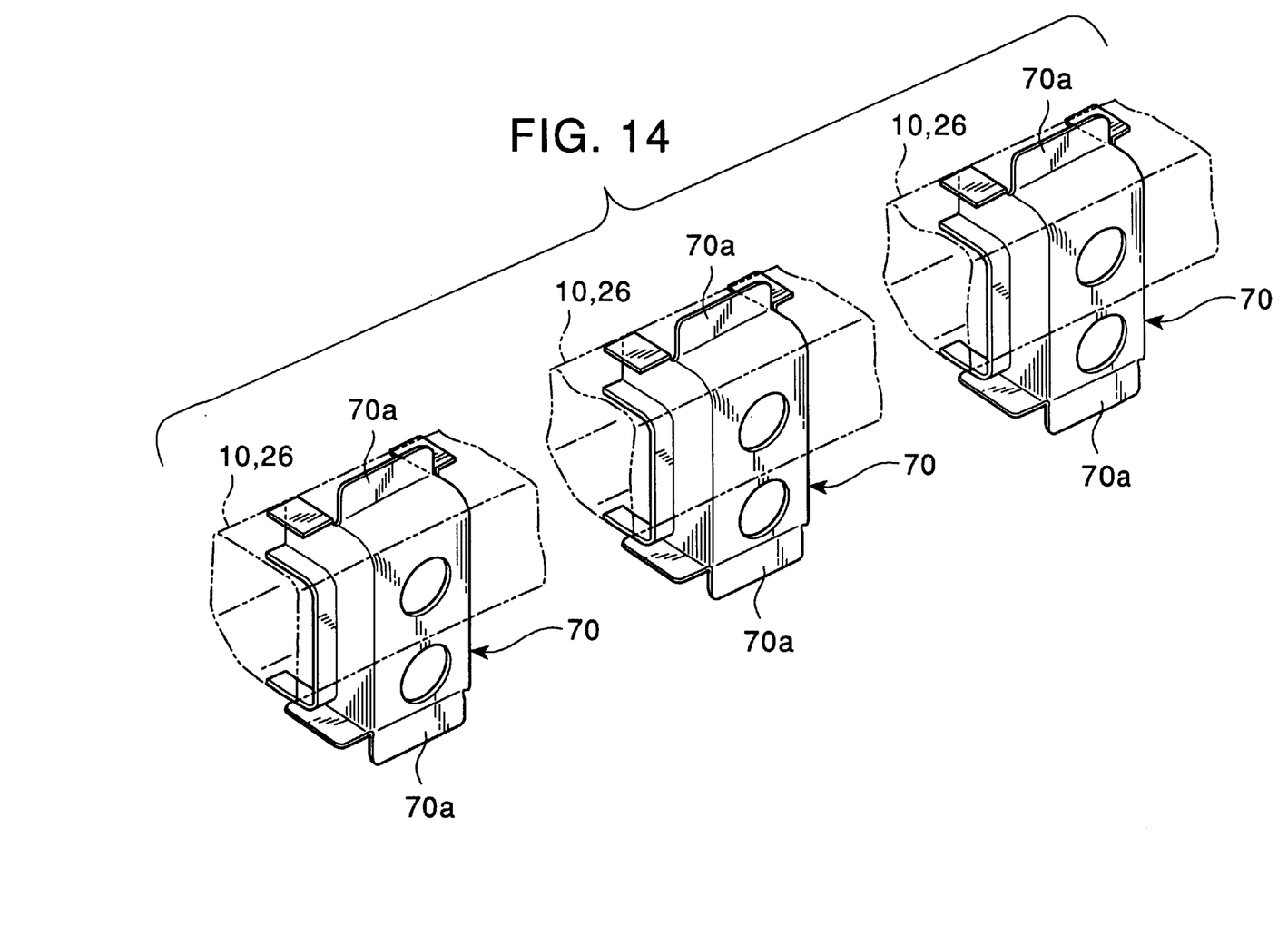
FIG. 14 is a partial perspective view of a fourth embodiment.
Figure 15:
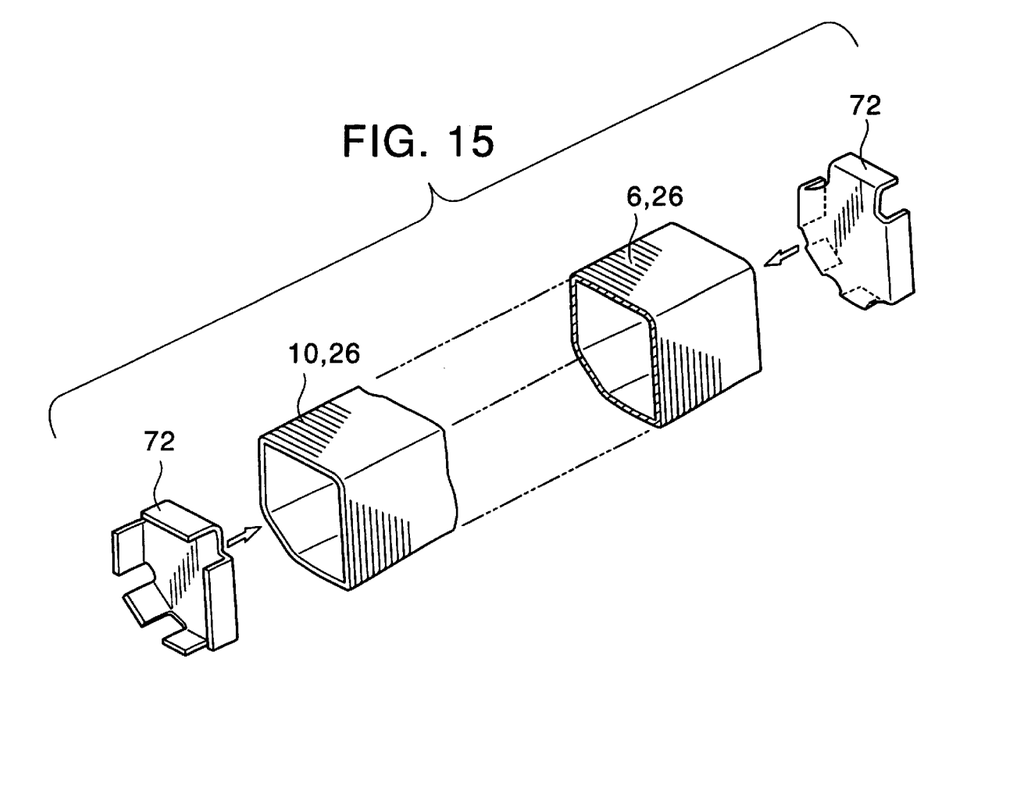
FIG. 15 is a perspective view of both ends of a side sill reinforcement of the fourth embodiment.

FIGS. 14 and 15 show only the partial structure of the side sill section 6 that are different from the first embodiment. Referring to FIG. 14, a plurality of node members 70 are disposed along the vehicle front and rear direction within a space between the side sill outer (not shown in FIG. 14) and the side sill reinforcement 26. The node members 70 are respectively provided with flanges 70a. The flanges 70a of the node members 70 are respectively connected with the flanges 40A, 42A of both the side sill outer 40 and the side sill inner 42 FIG. 7, by welding or the like.

Referring to FIG. 15, caps 72 having node configurations are respectively attached to both ends of the side sill reinforcement 26.

According to the fourth embodiment, since the node members 70 and the caps 72 are attached to the side sill reinforcement 26 of the second closed section structure 10, the rigidity of the side sill section 6 is increased and the distortion of the side sill section 6 is prevented.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. A body structure of a motor vehicle comprising:
    a first closed section structure having a first closed section which is made of a plurality of members; and
    a second closed section structure having a second closed section, the second closed section structure being disposed within the first closed section of the first closed section structure and made of a single member, said second closed section structure having a section configuration which changes in accordance with changes in the inner side configuration of the first closed section structure.

2. A body structure of a motor vehicle according to claim 1, wherein said first closed section structure has the first closed section which integrally forms at least a roof rail and a center pillar, and said second closed section structure is integrally disposed along areas of the roof rail and the center pillar of the first closed section structure.

3. A body structure of a motor vehicle according to claim 2, wherein said first closed section structure includes a roof rail outer and a roofrail inner both of which respectively have flanges which are mutually connected so as to form the first closed section, and said body structure further comprises seal means attached to the flanges for sealing an opening of a door.

4. A body structure of a motor vehicle according to claim 1, wherein said first closed section structure has the first closed section which integrally forms at least a center pillar and a side sill, and said second closed section structure is integrally disposed along areas of the center pillar and the side sill of the first closed section structure.

5. A body structure of a motor vehicle according to claim 1, wherein said first closed section structure has the first closed section which integrally forms at least a roof rail, a center pillar and a side sill, and said second closed section structure is integrally disposed along areas of the roof rail, the center pillar and the side sill of the first closed section structure.

6. A body structure of a motor vehicle according to claim 5, wherein said first closed section structure includes a roof rail outer and a roof rail inner both of which respectively have flanges which are mutually connected so as to form the first closed section, and said body structure further comprises seal means attached to the flanges for sealing an opening of a door.

7. A body structure of a motor vehicle according to claim 1, wherein one surface of the fist closed section structure and one surface of the second closed section of the closed section structure are mutually connected at predetermined portions thereof.

8. A body structure of a motor vehicle according to claim 7, wherein one surface of the first closed section of the first closed section structure and one surface of the second closed section of the second closed section structure are mutually connected at predetermined portions thereof by a fixing member penetrating through the surfaces of the first and second closed section structures.

9. A body structure of a motor vehicle according to claim 2, wherein said fixing member fixes a door hinge to the first and second closed section structures.

10. A body structure of a motor vehicle according to claim 9, wherein a predetermined portion of the second closed section structure is filled with filler material for reinforcement.

11. A body structure of a motor vehicle according to claim 1, wherein a plurality of node members are provided along the vehicle front and rear direction on the second closed section structure.

12. A body structure of a motor vehicle according to claim 1, wherein said first closed section structure is manufactured by press molding, and said second closed section structure is manufactured by a tube hydraulic forming method.

13. A body structure of a motor vehicle comprising:
    a first closed section structure having a first closed section which is made of a plurality of members;
    a second closed section structure having a second closed section, the second closed section structure being disposed within the first closed section of the first closed section structure and made of a single member, said second closed section structure having a section configuration which changes in accordance with changes in the inner side configuration of the first closed section structure; and
    said first closed section structure having the first closed section which integrally forms at least a roof rail and a center pillar, and said second closed section structure being integrally disposed along areas of the roofrail and the center pillar of the first closed section.

14. A body structure of a motor vehicle according to claim 13, wherein said first closed section structure is manufactured by press molding, and said second closed section structure is manufactured by a tube hydraulic forming method.

15. A body structure of a motor vehicle according to claim 13, wherein one surface of the first closed section of the first closed section structure and one surface of the second closed section of the second closed section structure are mutually connected at predetermined portions thereof.

16. A body structure of a motor vehicle according to claim 13, wherein a plurality of node members are provided along the vehicle front and rear direction of the second closed section structure.

17. A body structure of a motor vehicle according to claim 13, wherein said first closed section structure includes a roof rail outer and a roof rail inner both of which respectively have flanges which are mutually connected so as to form the first closed section, and said body structure further comprises seal means attached to the flanges for sealing an opening of a door.

18. A body structure of a motor vehicle comprising:
    a first closed section structure having a first closed section which is made of a plurality of members;
    a second closed section structure having a second closed section, the second closed section structure being disposed within the first closed section of the first closed section structure and made of a single member, said second closed section structure having a section configuration which changes in accordance with changes in the inner side configuration of the first closed section structure; and
    said first closed section structure having the first closed section which integrally forms at least a center pillar and a side sill, and said second closed section structure being integrally disposed along areas of the center pillar and the side sill of the first closed section structure.

19. A body structure of a motor vehicle according to claim 18, wherein said first closed section structure is manufactured by press molding and said second closed section structure is manufactured by a tube hydraulic forming method.

20. A body structure of a motor vehicle according to claim 18, wherein one surface of the first closed section of the first closed section structure and one surface of the second closed section of the second closed section structure are mutually connected at predetermined portions thereof.

21. A body structure of a motor vehicle according to claim 18, wherein a plurality of node members are provided along the vehicle front and rear direction on the second closed section.

22. A body structure of a motor vehicle comprising:

a first closed section structure having a first closed section which is made of a plurality of members;

a second closed section structure having a second closed section, the second closed section structure being disposed within the first closed section of the first closed section structure and made of a single member, said second closed section structure having a section configuration which changes in accordance with changes in the inner side configuration of the first closed section structure; and said first closed section structure having the first closed section which integrally forms at least a roof rail, a center pillar and a side sill, and said second closed section structure being integrally disposed along areas of the roof rail, the center pillar and the side sill of the first closed section structure.

23. A body structure of a motor vehicle according to claim 22, wherein said first closed section structure is manufactured by press molding, and said second closed section structure is manufactured by a tube hydraulic forming method.

24. A body structure of a motor vehicle according to claim 22, wherein one surface of the first closed section of the first closed section structure and one surface of the second closed section of the second closed section structure are mutually connected at predetermined portions thereof.

25. A body structure of a motor vehicle according to claim 22, wherein an plurality of node members are provided along the vehicle front and rear direction of the second closed section structure.

26. A body structure of a motor vehicle according to claim 22, wherein said first closed section structure includes a roof rail outer and a roof rail inner both of which respectively having flanges which are mutually connected so as to form the first closed section, and said body structure further comprises seal means attached to the flanges for sealing an opening of a door.

* * * * *